United States Patent
Marino et al.

(10) Patent No.: US 11,897,032 B2
(45) Date of Patent: Feb. 13, 2024

(54) APPARATUS FOR POWDER BED FUSION

(71) Applicant: The Boeing Company, Chicago, IL (US)

(72) Inventors: Anthony P. Marino, Tacoma, WA (US); Scott H. Fife, Roy, UT (US); Gary M. Lindahl, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 17/366,651

(22) Filed: Jul. 2, 2021

(65) Prior Publication Data
US 2022/0080509 A1  Mar. 17, 2022

Related U.S. Application Data (60) Provisional application No. 63/077,859, filed on Sep. 14, 2020.

(51) Int. Cl.
*B22F 12/30* (2021.01)
*B33Y 30/00* (2015.01)
(Continued)

(52) U.S. Cl.
CPC .............. *B22F 12/30* (2021.01); *B22F 10/28* (2021.01); *B33Y 10/00* (2014.12); *B33Y 30/00* (2014.12)

(58) Field of Classification Search
CPC ........... B22F 12/30; B22F 10/28; B33Y 30/00
See application file for complete search history.

(56) References Cited

U.S. PATENT DOCUMENTS

| 2008/0169589 A1* | 7/2008 | Sperry | B33Y 30/00 |
| | | | 264/494 |
| 2008/0230414 A1* | 9/2008 | Perret | B29C 64/153 |
| | | | 206/349 |

(Continued)

FOREIGN PATENT DOCUMENTS

| DE | 10 2016 211214 A1 | 12/2017 | |
| WO | WO-2018197888 A1 * | 11/2018 | ............ B22F 3/1055 |

OTHER PUBLICATIONS

CBPerformance, Sep. 2, 2016, Graphite Compression Gaskets, https://web.archive.org/web/20160902125415/https://www.cbperformance.com/Graphite-Compression-Gaskets-s/115.htm (Year: 2016).*

(Continued)

*Primary Examiner* — Nicholas A Wang
*Assistant Examiner* — Jacob J Gusewelle
(74) *Attorney, Agent, or Firm* — McDonnell Boehnen Hulbert & Berghoff LLP (57) ABSTRACT

An apparatus includes a wall that defines a shaft, a powder platform configured to support a powder bed within the shaft and configured to move through the shaft, and a sealing device that is in a compressed state from an outer perimeter of the sealing device to an inner perimeter of the sealing device such that the outer perimeter contacts the wall and the inner perimeter contacts the powder platform to form a seal between the powder platform and the wall. Another apparatus includes a wall that defines a shaft, a powder platform configured to support a powder bed within the shaft and configured to move through the shaft, and a sealing device comprising a non-fibrous material that is affixed to the powder platform and extends away from the powder platform, the sealing device contacting the wall to form a seal between the powder platform and the wall.

20 Claims, 12 Drawing Sheets

(51) Int. Cl.
 *B22F 10/28* (2021.01)
 *B33Y 10/00* (2015.01)

(56) References Cited

U.S. PATENT DOCUMENTS

2018/0126460 A1 5/2018 Murphree et al.
2018/0186081 A1 7/2018 Milshtein et al.
2019/0291184 A1 9/2019 Buller et al.

OTHER PUBLICATIONS

Extended European Search Report prepared by the European Patent Office in application No. EP 21 18 5332.0 dated Jan. 4, 2022.

\* cited by examiner

```
┌─────────────────────────────────────────────────────────────────┐
│  PROVIDING A POWDER BED THAT IS SUPPORTED BY A POWDER           │
│  PLATFORM WITHIN A SHAFT DEFINED BY A WALL                      │
└─────────────────────────────────────────────────────────────────┘
       302
         │
         ▼
┌─────────────────────────────────────────────────────────────────┐
│  SELECTIVELY SINTERING A PORTION OF AN EXPOSED LAYER OF         │
│  THE POWDER BED                                                 │
└─────────────────────────────────────────────────────────────────┘
       304
         │
         ▼
┌─────────────────────────────────────────────────────────────────┐
│  MOVING THE POWDER PLATFORM DOWNWARD WITHIN THE                 │
│  SHAFT WHILE A SEALING DEVICE MAINTAINS A SEAL BETWEEN          │
│  THE POWDER PLATFORM AND THE WALL, THE SEALING DEVICE           │
│  BEING IN A COMPRESSED STATE FROM AN OUTER PERIMETER OF         │
│  THE SEALING DEVICE THAT CONTACTS THE WALL TO AN INNER          │
│  PERIMETER OF THE SEALING DEVICE THAT CONTACTS THE              │
│  POWDER PLATFORM                                                │
└─────────────────────────────────────────────────────────────────┘
       306
```

PROVIDING A POWDER BED THAT IS SUPPORTED BY A POWDER PLATFORM WITHIN A SHAFT DEFINED BY A WALL

402

SELECTIVELY SINTERING A PORTION OF AN EXPOSED LAYER OF THE POWDER BED

404

MOVING THE POWDER PLATFORM DOWNWARD WITHIN THE SHAFT WHILE A SEALING DEVICE MAINTAINS A SEAL BETWEEN THE POWDER PLATFORM AND THE WALL, THE SEALING DEVICE INCLUDING A NON-FIBROUS MATERIAL THAT IS AFFIXED TO THE POWDER BED AND EXTENDS AWAY FROM THE POWDER BED

APPARATUS FOR POWDER BED FUSION

CROSS REFERENCE TO RELATED APPLICATION

The present application is a non-provisional patent application claiming priority to U.S. Provisional Application No. 63/077,859, filed on Sep. 14, 2020, the contents of which are hereby incorporated by reference.

FIELD

The present disclosure generally relates to apparatuses and methods for powder bed fusion, and more specifically to apparatuses and methods for powder bed fusion that involve a sealing device.

BACKGROUND

Powder bed fusion is an additive manufacturing technique that generally involves a laser beam or an electron beam being used to form a rigid component (e.g., an aircraft component) from a powder bed of material such as metal. The beam is selectively scanned over an exposed area of the powder bed to sinter the powder at desired locations, thereby forming the desired contours of the component. Thereafter, a powder platform that supports the powder bed is lowered, additional powder is provided on the top of the powder bed, and the beam is used to form contours at a higher level of the component, and so on.

Often, a fibrous material such as a woven nylon ring is used to form a rudimentary seal between the powder platform and a shaft that encloses the powder bed and the powder platform. However, loose powder will tend to drop past the ring and below the powder platform, which typically necessitates periodic removal of powder from under the powder platform. Additionally, the friction of the ring rubbing against the shaft can cause the ring to shed fibers onto the powder bed, which can contaminate and compromise the component being formed by the apparatus. As such, a need exists for a powder bed fusion apparatus that better prevents loose powder from migrating to unwanted areas and that can reduce or eliminate shedding of foreign material into the component being formed.

SUMMARY

One aspect of the disclosure is an apparatus for powder bed fusion, the apparatus comprising: a wall that defines a shaft; a powder platform configured to support a powder bed within the shaft and configured to move through the shaft; and a sealing device that is in a compressed state from an outer perimeter of the sealing device to an inner perimeter of the sealing device such that the outer perimeter contacts the wall and the inner perimeter contacts the powder platform to form a seal between the powder platform and the wall.

Another aspect of the disclosure is an apparatus for powder bed fusion, the apparatus comprising: a wall that defines a shaft; a powder platform configured to support a powder bed within the shaft and configured to move through the shaft; and a sealing device comprising a non-fibrous material that is affixed to the powder platform and extends away from the powder platform, the sealing device contacting the wall to form a seal between the powder platform and the wall.

Another aspect of the disclosure is a method of performing powder bed fusion, the method comprising: providing a powder bed that is supported by a powder platform within a shaft defined by a wall; selectively sintering a portion of an exposed layer of the powder bed; and moving the powder platform downward within the shaft while a sealing device maintains a seal between the powder platform and the wall, the sealing device being in a compressed state from an outer perimeter of the sealing device that contacts the wall to an inner perimeter of the sealing device that contacts the powder platform.

Another aspect of the disclosure is a method of performing powder bed fusion, the method comprising: providing a powder bed that is supported by a powder platform within a shaft defined by a wall; selectively sintering a portion of an exposed layer of the powder bed; and moving the powder platform downward within the shaft while a sealing device maintains a seal between the powder platform and the wall, the sealing device including a non-fibrous material that is affixed to the powder platform and extends away from the powder platform.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

DETAILED DESCRIPTION

As discussed above, a need exists for a powder bed fusion apparatus that better prevents loose powder from migrating to unwanted areas and that can reduce or eliminate shedding of foreign material into the component being formed. Within examples, an apparatus for powder bed fusion includes a wall that defines a shaft, a powder platform configured to support a powder bed (e.g., powdered metal) within the shaft and configured to move through the shaft, and a sealing device that is in a compressed state from an outer perimeter of the sealing device to an inner perimeter of the sealing device such that the outer perimeter contacts the wall and the inner perimeter contacts the powder platform to form a seal between the powder platform and the wall.

In another example, an apparatus for powder bed fusion includes a wall that defines a shaft, a powder platform configured to support a powder bed within the shaft and configured to move through the shaft, and a sealing device that includes a non-fibrous material (e.g., metal coated with a solid lubricant) that is affixed to the powder platform and extends away from the powder platform, the sealing device contacting the wall to form a seal between the powder platform and the wall.

The aforementioned apparatuses can better prevent loose powder from migrating to unwanted areas and can reduce or eliminate shedding of foreign material into the component being formed, when compared to conventional apparatuses for powder bed fusion.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-10 are schematic diagrams of an apparatus 100 and related functionality.

Figure 1:
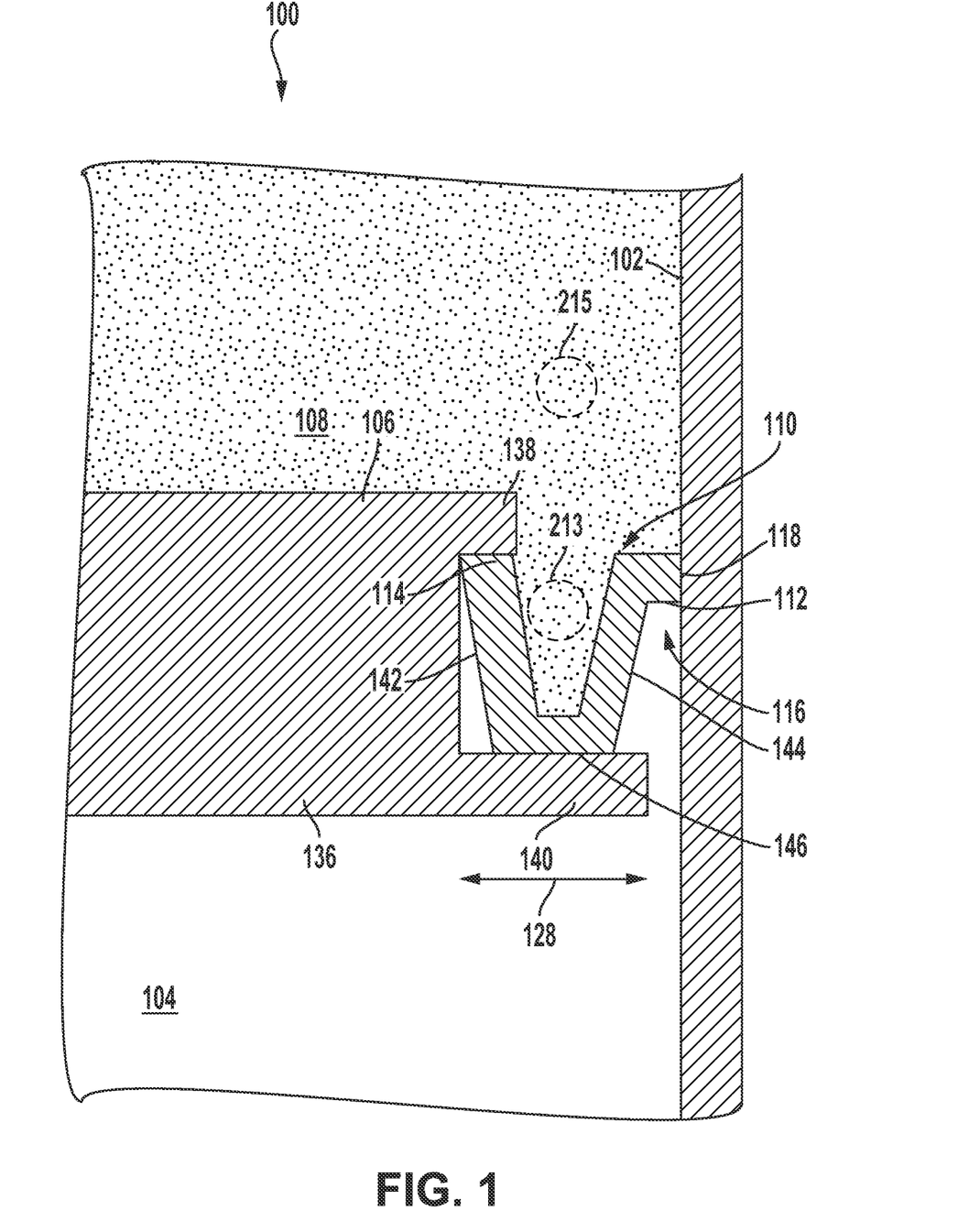
FIG. 1 is a cross-sectional view of an apparatus, according to an example.

FIG. 1 is a cross-sectional view of the apparatus 100 for powder bed fusion. The apparatus 100 includes a wall 102 that defines a shaft 104. The apparatus 100 also includes a powder platform 106 configured to support a powder bed 108 within the shaft 104 and configured to move through the shaft 104. The apparatus 100 also includes a sealing device 110 that is in a compressed state from an outer perimeter 112 of the sealing device 110 to an inner perimeter 114 of the sealing device 110 such that the outer perimeter 112 contacts the wall 102 and the inner perimeter 114 contacts the powder platform 106 to form a seal 116 between the powder platform 106 and the wall 102.

The wall 102 can be formed of metal, but other materials are possible. In examples described below, the wall 102 fully or partially defines the shaft 104. That is, the wall 102 forms a perimeter of the shaft 104. In examples described below, the shaft 104 can have a rectangular shape, a square shape, or a circular shape.

The powder platform 106 is generally formed of metal as well. The powder platform 106 supports the powder bed 108 during formation of a component from the powder bed 108. The powder platform 106 includes a body 136, a first member 138 that extends toward the wall 102 and away from the body 136, and a second member 140 that extends toward the wall 102 and away from the body 136 further than the first member 138. The body 136, the first member 138, and the second member 140 form a pocket or cavity into which the sealing device 110 (e.g., the inner perimeter 114) fits.

The powder bed 108 typically includes powdered metal, but other examples are possible. A laser or an electron-beam is used to selectively sinter portions of the powder bed 108 on a layer by layer basis to form a component (e.g., an aircraft component). This process is described in more detail below.

The sealing device 110 can be formed of bendable or elastic metal. That is, the sealing device 110 can return to its original (e.g., relaxed) shape after being deformed to fit between the wall 102 and the powder platform 106. In FIG. 1, the sealing device 110 is under compression and applies a force 128 against the wall 102 via the outer perimeter 112 and applies the force 128 to the powder platform 106 via the inner perimeter 114. The sealing device 110 acts as a gasket forming the seal 116 between the powder platform 106 and the wall 102. The seal 116 generally prevents a significant amount of the powder bed 108 from falling between the wall 102 and the powder platform 106 (e.g., as the powder platform 106 moves up or down).

The sealing device 110 includes a first arm 142 that contacts the first member 138, a second arm 144 that contacts the wall 102, and a base 146 that joins the first arm 142 and the second arm 144 and contacts the second member 140. When the sealing device 110 is in the compressed state, the first arm 142 is bent toward the second arm 144 and the sealing device 110 stores mechanical energy. For example, the dimensions of the powder platform 106 (e.g., the body 136, the first member 138, and/or the second member 140) might require that the sealing device 110 be in the compressed state to fit between the first member 138, the second member 140, and the wall 102 as shown in FIG. 1. The compressed state can include any condition in which the sealing device 110 is experiencing a compressive force and/or exerting an expanding force on the powder platform 106 and/or the wall 102.

The outer perimeter 112 includes a non-fibrous surface 118 that contacts the wall 102. An exterior of the sealing device 110 can be formed with a solid lubricant coating such as polytetrafluoroethylene that forms the non-fibrous surface 118. The outer perimeter 112 substantially conforms to the wall 102.

A portion 213 of the powder bed 108 between the first arm 142 and the second arm 144 will generally force the first arm 142 and the second arm 144 away from each other via gravity, thereby contributing to the force 128 and making for a more effective seal 116. A portion 215 of the powder bed 108 that is above the sealing device 110 will also contribute to the force 128.

Figure 2:
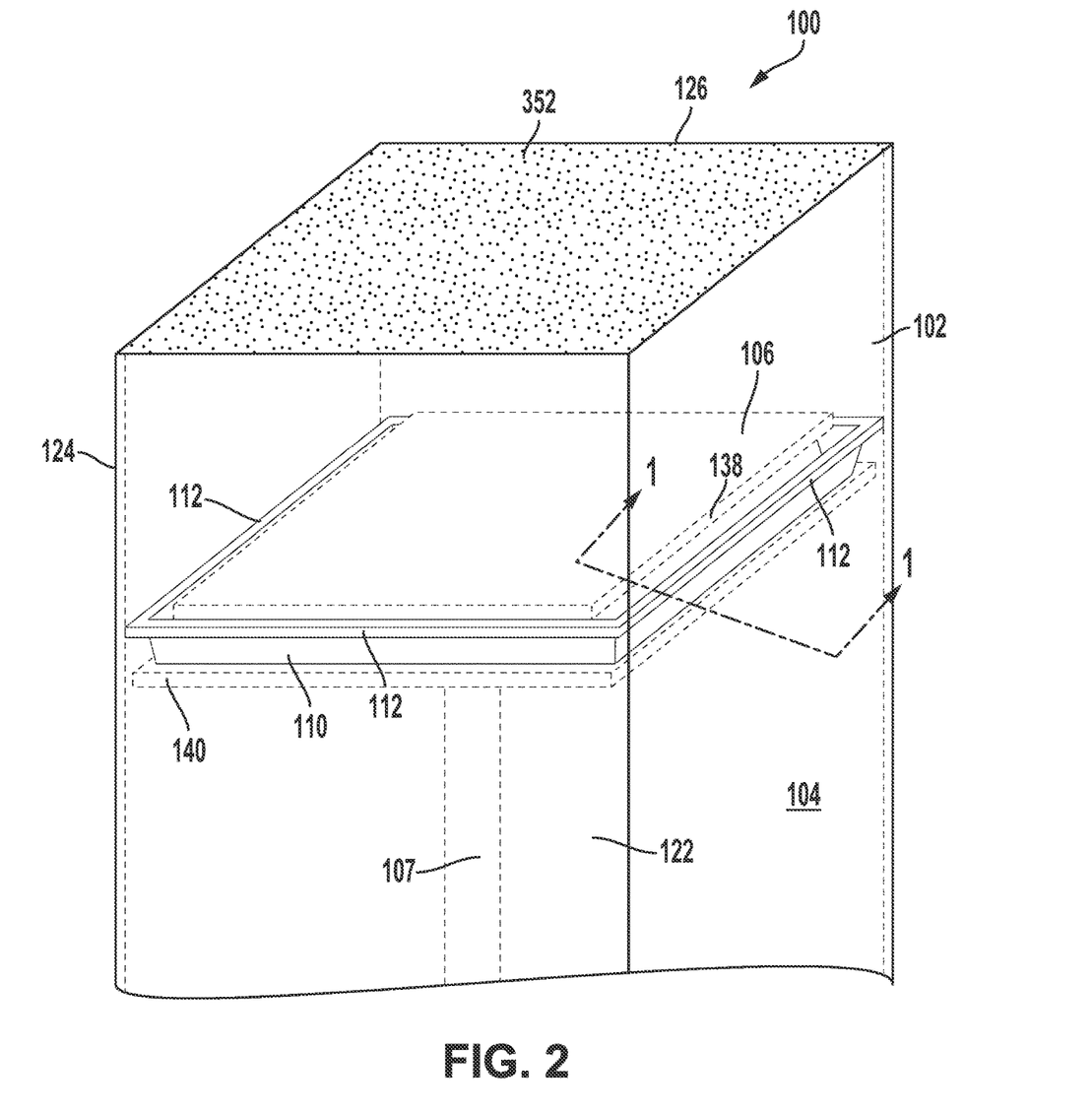
FIG. 2 is a perspective view of an apparatus, according to an example.

FIG. 2 is a perspective view of the apparatus 100. As shown, the apparatus 100 further includes a second wall 122, a third wall 124, and a fourth wall 126. The shaft 104 has a rectangular shape (e.g., a square shape) defined by the wall 102, the second wall 122, the third wall 124, and the fourth wall 126. In applications in which the apparatus 100 is used to form components having a rectangular symmetry or shape, it can be useful for the wall 102, the second wall 122, the third wall 124, and the fourth wall 126 (e.g., the shaft 104) to have a rectangular symmetry and/or shape as well.

In FIG. 2, the powder platform 106 is shown with dashed lines and the wall 102, the second wall 122, the third wall 124, and the fourth wall 126 are transparent so that the sealing device 110 can be more easily discerned. Additionally, only an exposed layer 352 the powder bed 108 is shown. In FIG. 2, the sealing device 110 has a square or rectangular shape that substantially conforms to the wall 102, the second wall 122, the third wall 124, and the fourth wall 126. That is, the outer perimeter 112 forms the seal 116 against the wall 102, the second wall 122, the third wall 124, and the fourth wall 126. A piston 107 is used to move the powder platform 106 up or down through the shaft 104 as desired.

Figure 3:
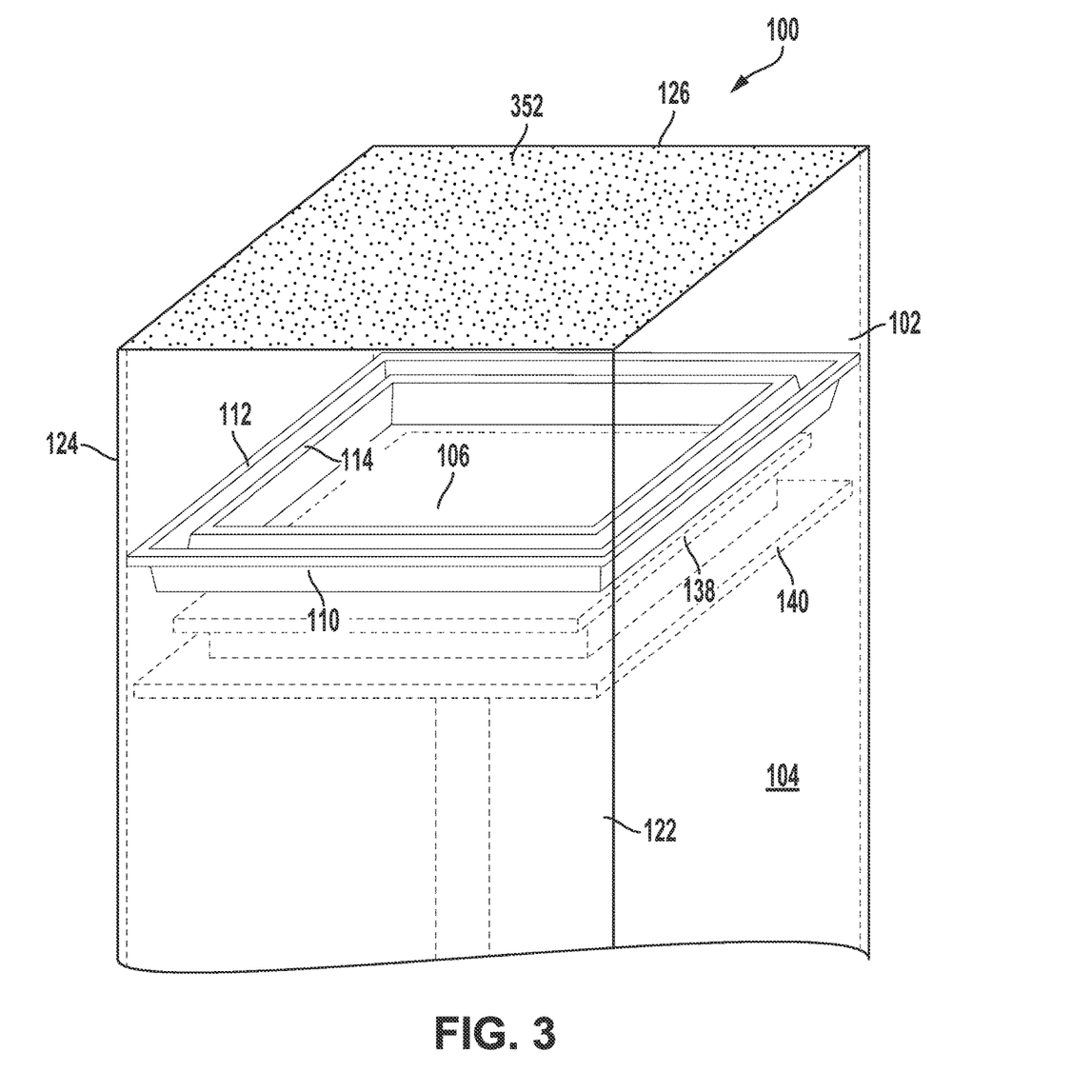
FIG. 3 is an exploded view of an apparatus, according to an example.

FIG. 3 is an exploded view of the apparatus 100.

Figure 4:
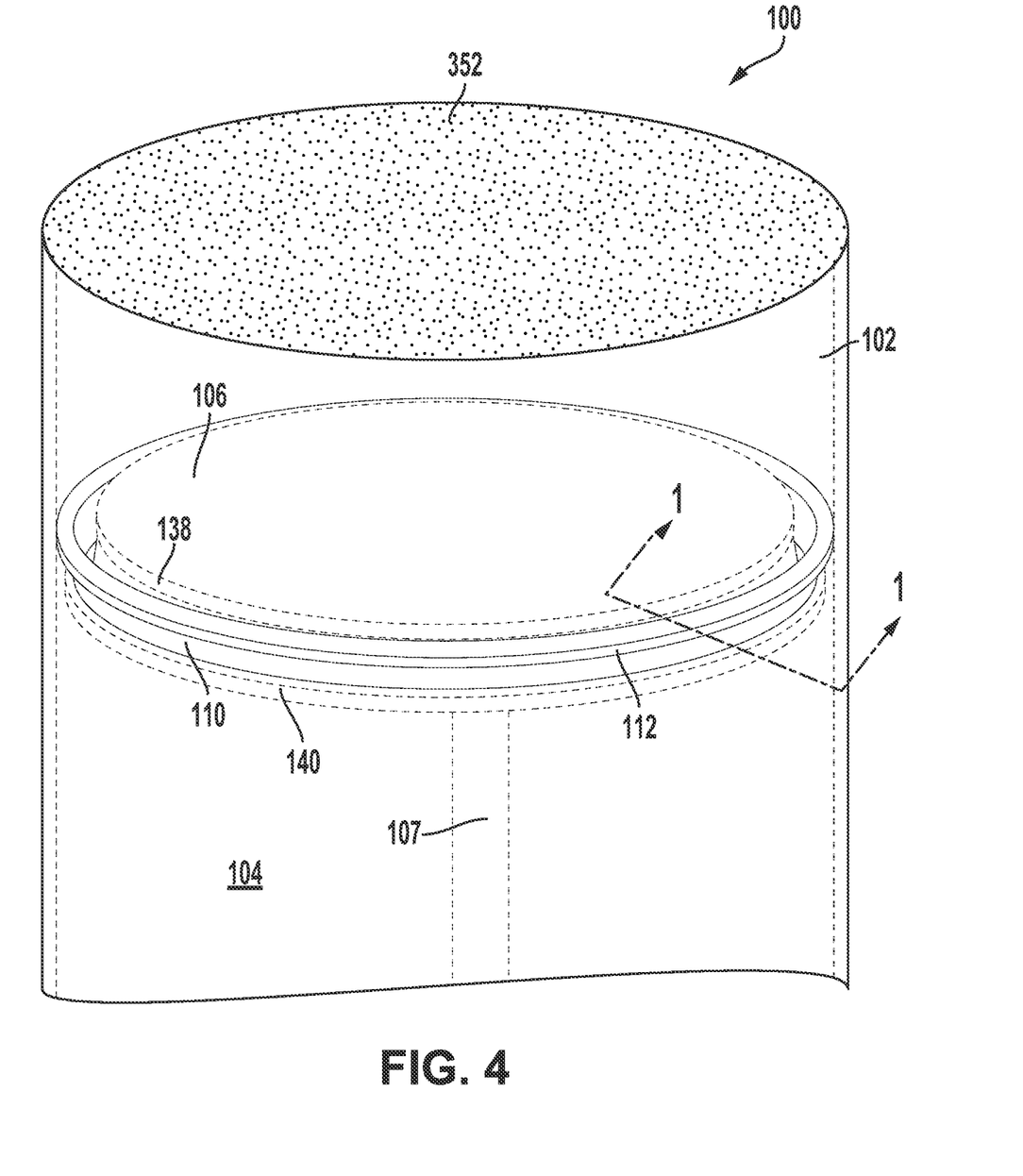
FIG. 4 is a perspective view of an apparatus, according to an example.

FIG. 4 is a perspective view of the apparatus 100, depicting an example in which the apparatus 100, the wall 102, and the shaft 104 all have a circular shape. In FIG. 4, the powder platform 106 is shown with dashed lines and the wall 102 is transparent so that the sealing device 110 can be more easily discerned. Additionally, only the exposed layer 352 of the powder bed 108 is shown. In FIG. 4, the sealing device 110 has a circular shape that substantially conforms to the wall 102. That is, the outer perimeter 112 forms the seal 116 against the wall 102. In applications in which the apparatus 100 is used to form components having rotational symmetry, it can be useful for the wall 102 (e.g., the shaft 104) to have a circular shape and/or rotational symmetry.

Figure 5:
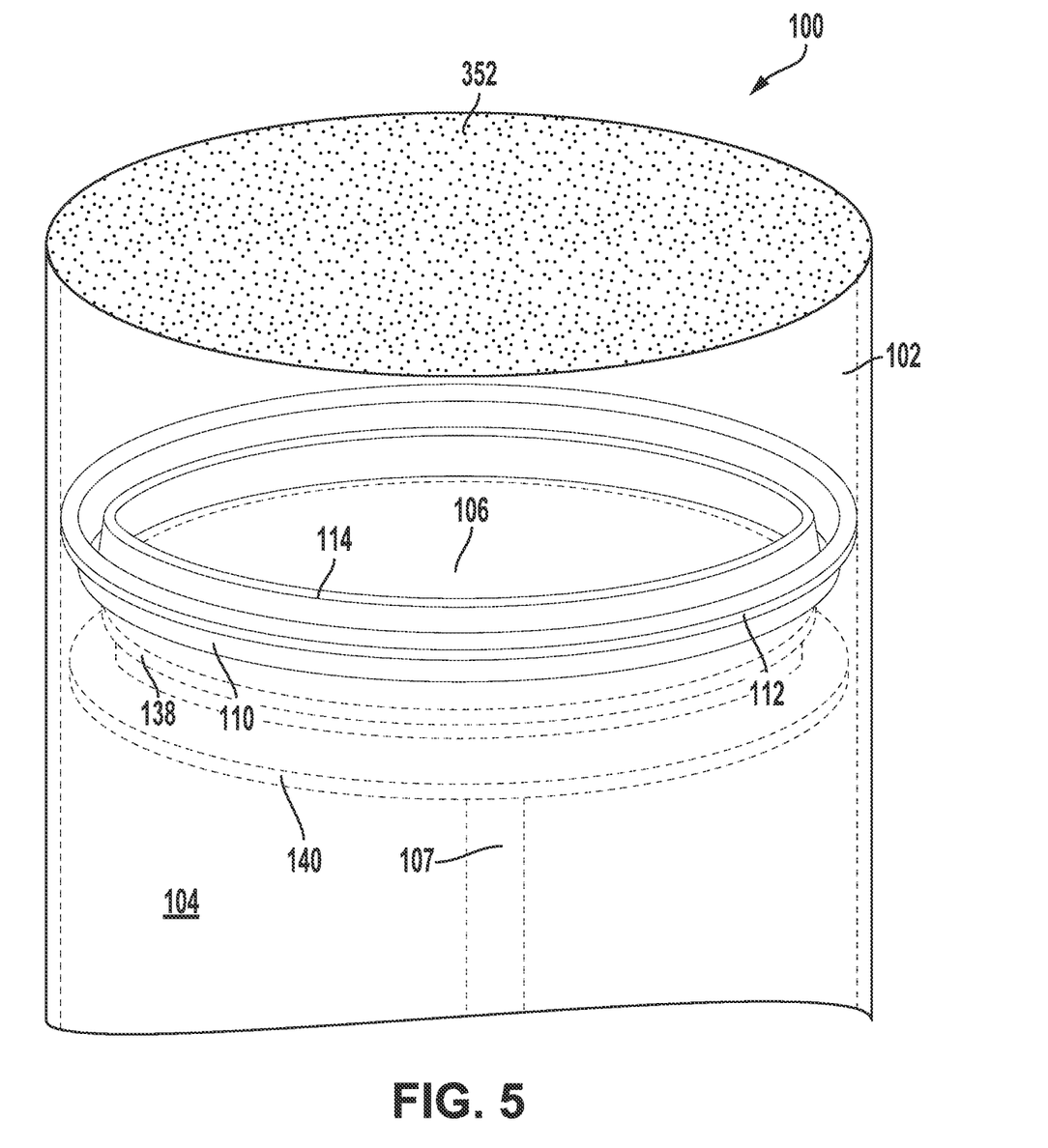
FIG. 5 is an exploded view of an apparatus, according to an example.

FIG. 5 is an exploded view of the apparatus 100 shown in FIG. 4.

Figure 6:
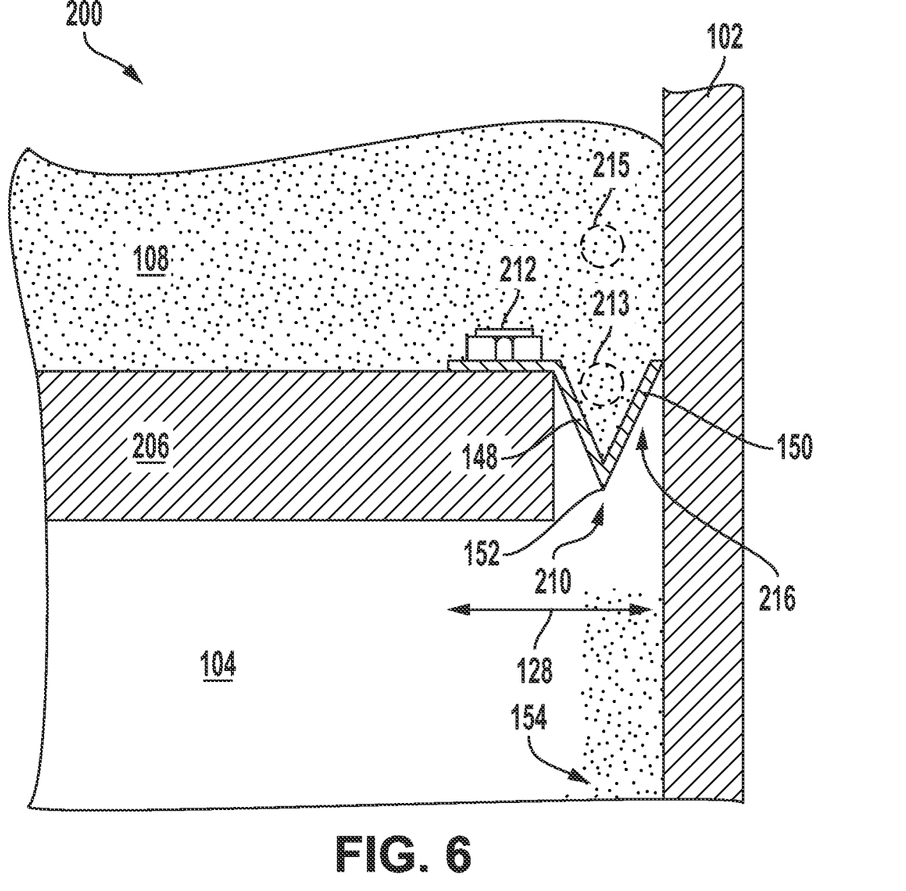
FIG. 6 is a cross-sectional view of an apparatus, according to an example.

FIG. 6 is a cross-sectional view of an apparatus 200 for powder bed fusion. The apparatus 200 includes the wall 102 that defines the shaft 104. The apparatus 200 also includes a powder platform 206 configured to support the powder bed 108 within the shaft 104 and configured to move through the shaft 104. The apparatus 200 also includes a sealing device 210 including a non-fibrous material that is affixed to the powder platform 206 and extends away from the powder platform 206. The sealing device 210 contacts the wall 102 to form a seal 216 between the powder platform 206 and the wall 102.

The powder platform 206 can include one or more features of the powder platform 106, however the powder platform 206 has a shape that differs from the powder platform 106 as shown.

The sealing device 210 can include one or more features of the sealing device 110, however the sealing device 210 has a shape that differs from the sealing device 110 as shown. The sealing device 210 includes and/or is formed of a non-fibrous material such as metal and can be coated with a solid lubricant such as polytetrafluoroethylene. In other examples, the non-fibrous material is a foam material or graphite.

The sealing device 210 acts as a gasket forming the seal 216 between the powder platform 206 and the wall 102. The seal 216 generally prevents a significant amount of the powder bed 108 from falling between the wall 102 and the powder platform 206 (e.g., as the powder platform 206 moves up or down). The sealing device 210 is configured to scrape powder 154 accumulated on the wall 102 away from the wall 102 (e.g., in the event that the powder platform 206 moves downward through the shaft 104). For example, the second arm 150 can move against the wall 102 as the powder platform 206 moves downward, thereby forcing the powder 154 away from the wall 102 and downward through the shaft 104. In some examples, the powder 154 is completely separated from the wall 102 by the second arm 150 and falls downward through the shaft 104.

The sealing device 210 includes a first arm 148 that contacts the powder platform 206. As shown, the first arm 148 is bolted onto the powder platform 206. The sealing device 210 also includes a second arm 150 that contacts the wall 102 and a pointed end 152 that joins the first arm 148 and the second arm 150 and is configured to scrape powder 154 accumulated on the wall 102 away from the wall 102.

A portion 213 of the powder bed 108 between the first arm 148 and the second arm 150 will generally force the first arm 148 and the second arm 150 away from each other via gravity, thereby contributing to the force 128 and making for a more effective seal 216. A portion 215 of the powder bed 108 that is above the sealing device 210 will also contribute to the force 128.

The sealing device 210 (e.g., the first arm 148) is fixed to the powder platform 206 via one or more bolts 212.

Figure 7:
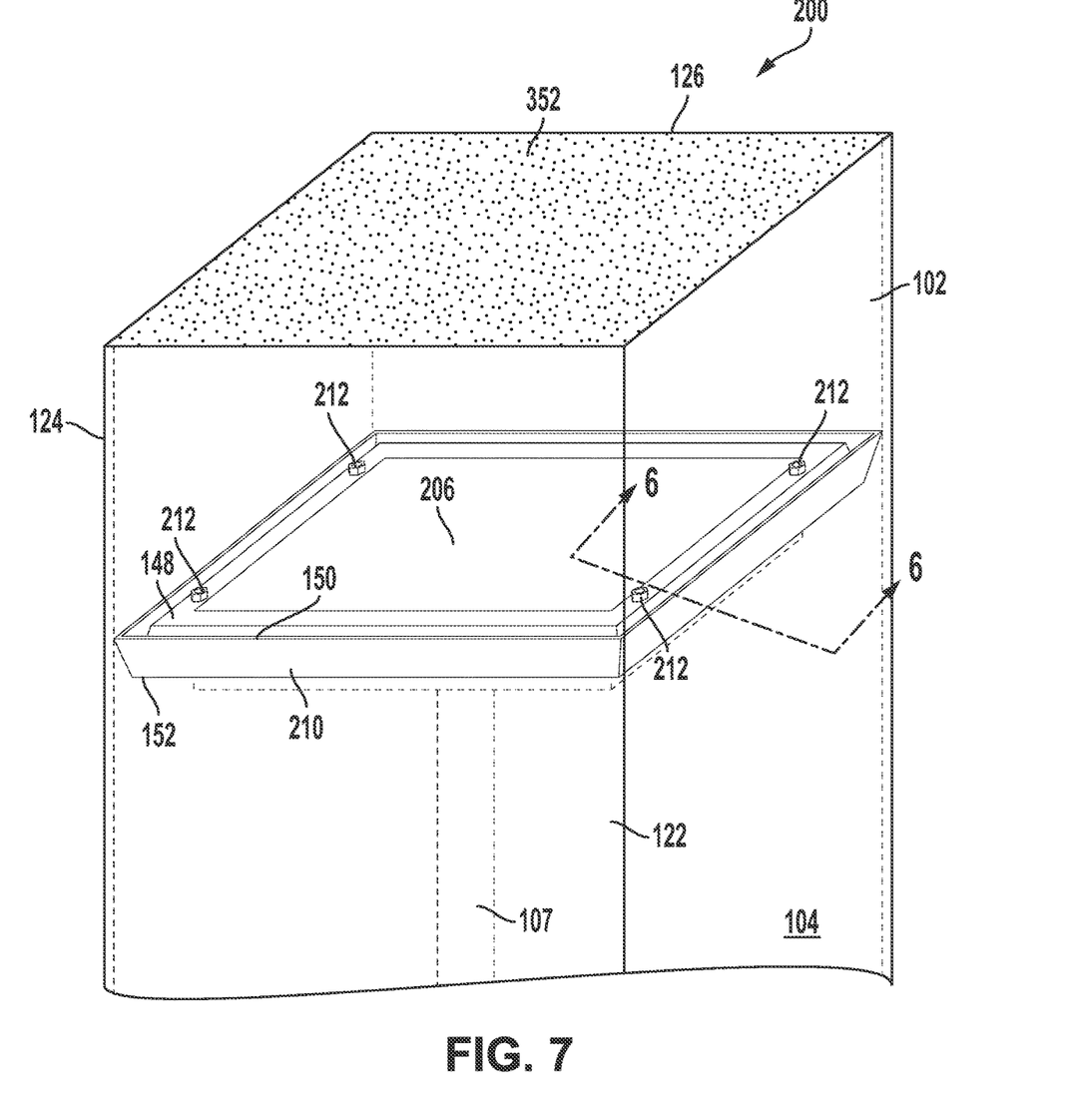
FIG. 7 is a perspective view of an apparatus, according to an example.

FIG. 7 is a perspective view of the apparatus 200. As shown, the apparatus 200 further includes the second wall 122, the third wall 124, and the fourth wall 126. The shaft 104 has a rectangular shape (e.g., a square shape) defined by the wall 102, the second wall 122, the third wall 124, and the fourth wall 126.

In FIG. 7, a bottom portion of the powder platform 206 is shown with dashed lines and the wall 102, the second wall 122, the third wall 124, and the fourth wall 126 are transparent so that the sealing device 210 can be more easily discerned. Additionally, only the exposed layer 352 of the powder bed 108 is shown. In FIG. 7, the sealing device 210 has a square or rectangular shape that substantially conforms to the wall 102, the second wall 122, the third wall 124, and the fourth wall 126. That is, the second arm 150 forms the seal 216 against the wall 102, the second wall 122, the third wall 124, and the fourth wall 126. The piston 107 is used to move the powder platform 206 up or down through the shaft 104 as desired.

Figure 8:
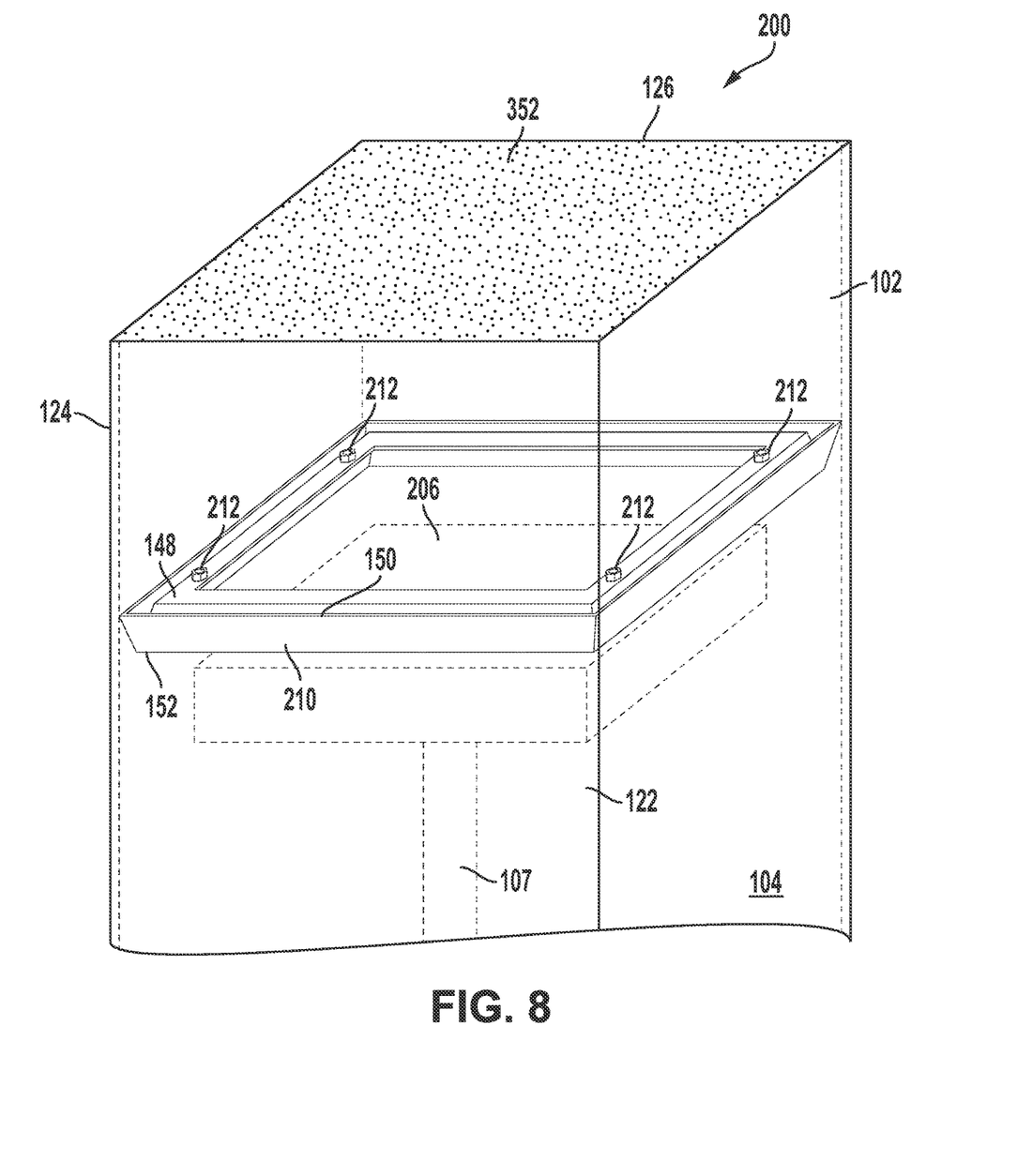
FIG. 8 is an exploded view of an apparatus, according to an example.

FIG. 8 is an exploded view of the apparatus 200.

Figure 9:
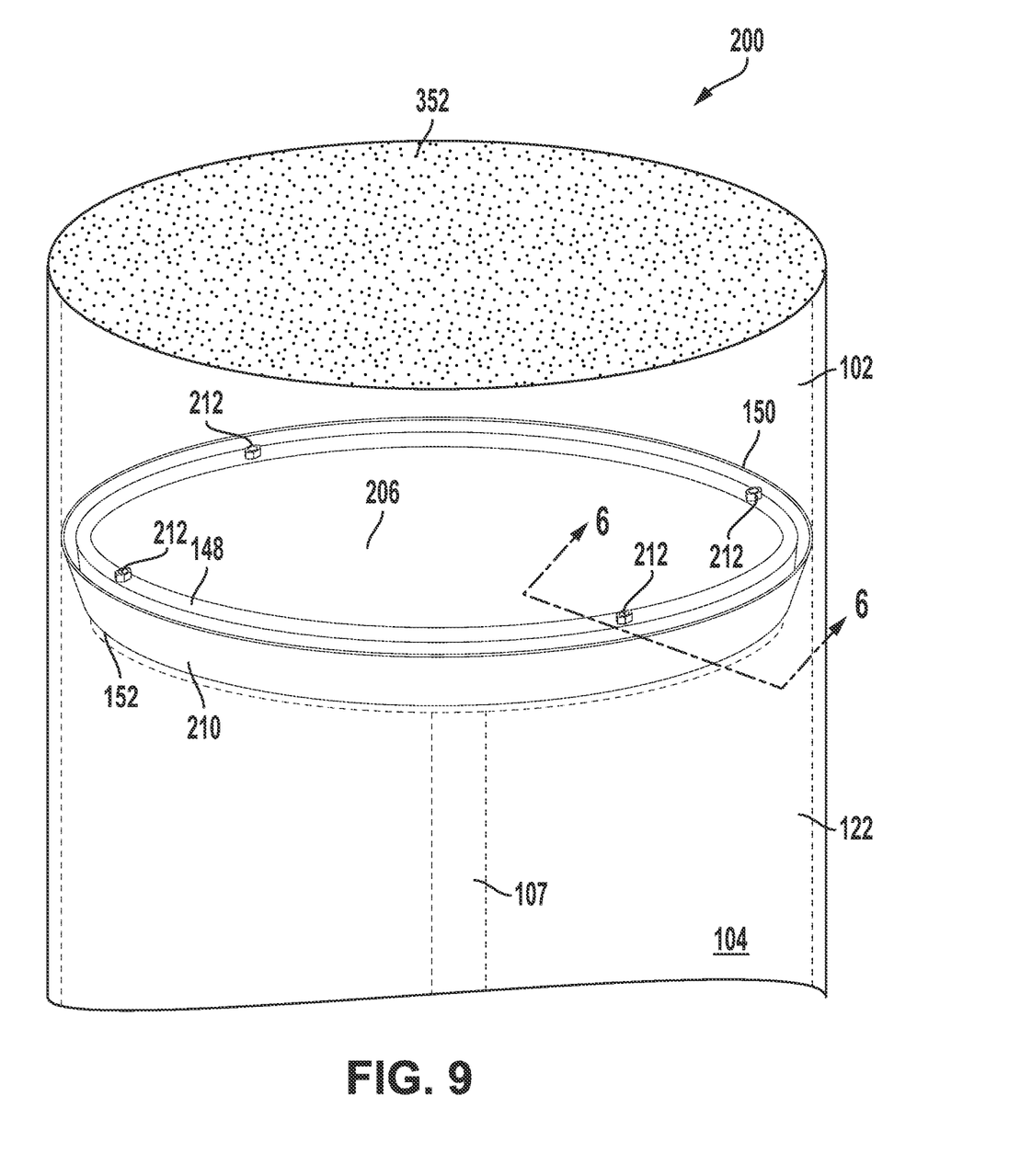
FIG. 9 is a perspective view of an apparatus, according to an example.

FIG. 9 is a perspective view of the apparatus 200, depicting an example in which the apparatus 200, the wall 102, and the shaft 104 all have a circular shape. In FIG. 9, a bottom portion of the powder platform 206 is shown with dashed lines and the wall 102 is transparent so that the sealing device 210 can be more easily discerned. Additionally, only the exposed layer 352 of the powder bed 108 is shown. In FIG. 9, the sealing device 210 has a circular shape that substantially conforms to the wall 102. That is, the second arm 150 forms the seal 116 against the wall 102.

Figure 10:
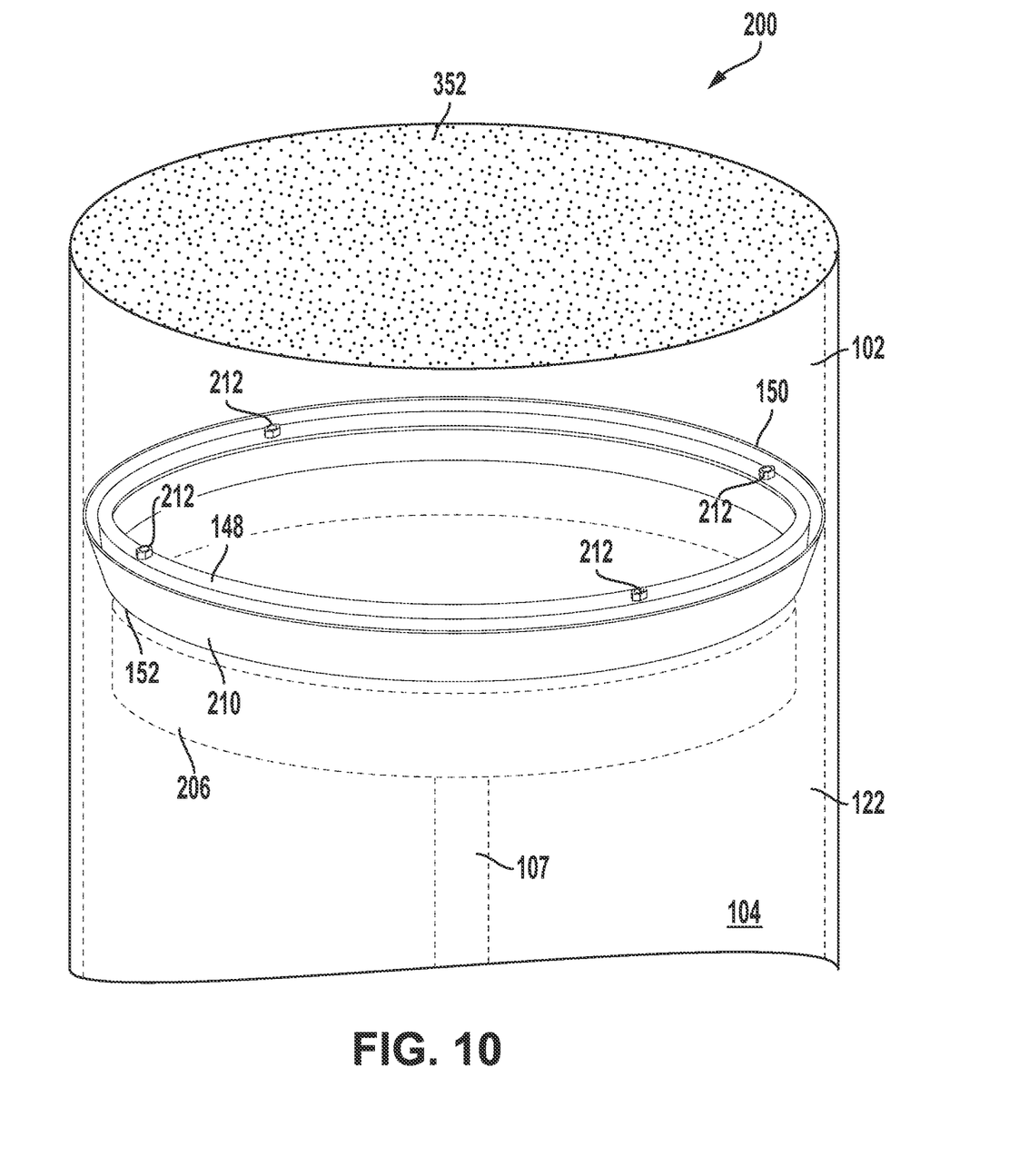
FIG. 10 is an exploded view of an apparatus, according to an example.

FIG. 10 is an exploded view of the apparatus 200 shown in FIG. 9.

Figure 11:
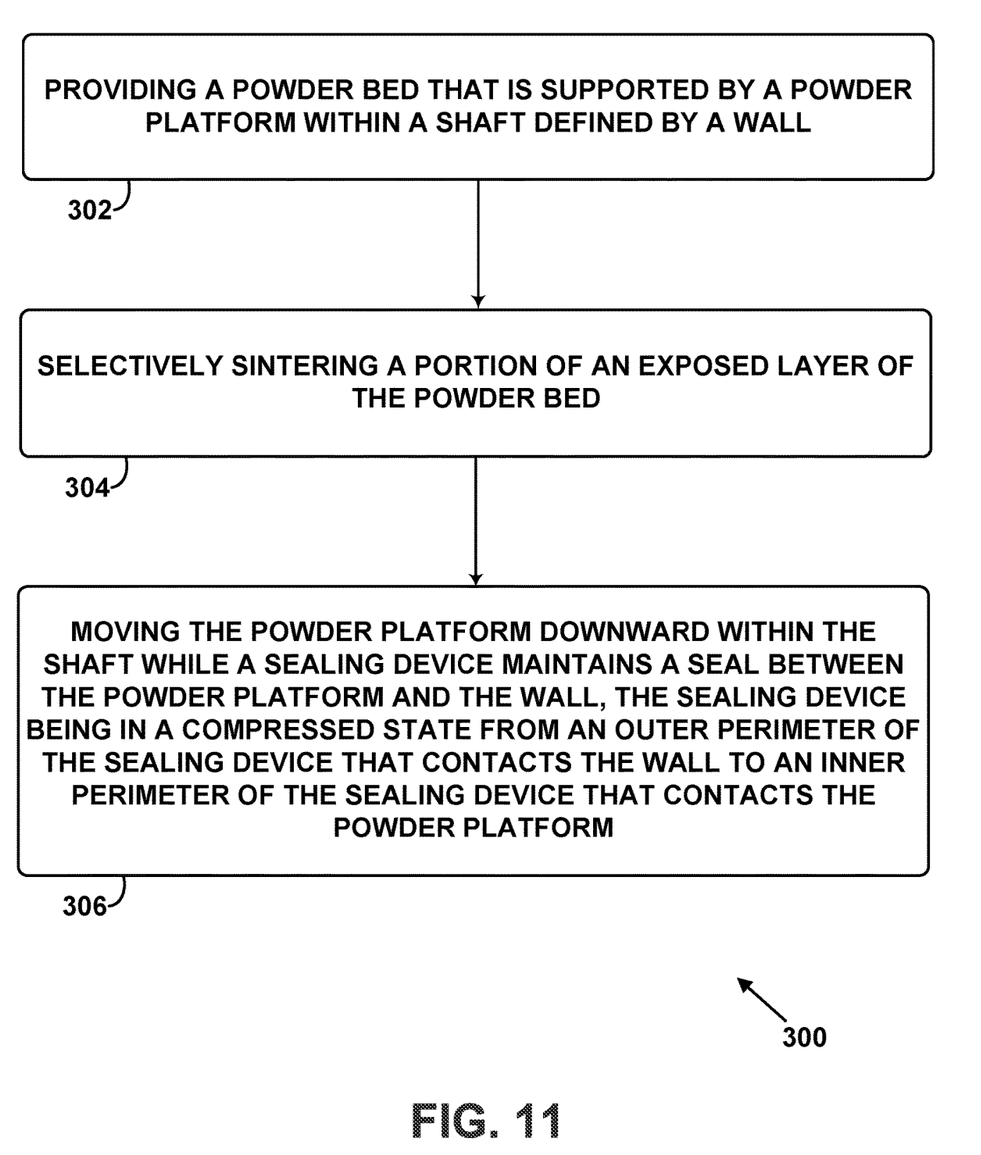
FIG. 11 is a block diagram of a method, according to an example.
Figure 12:
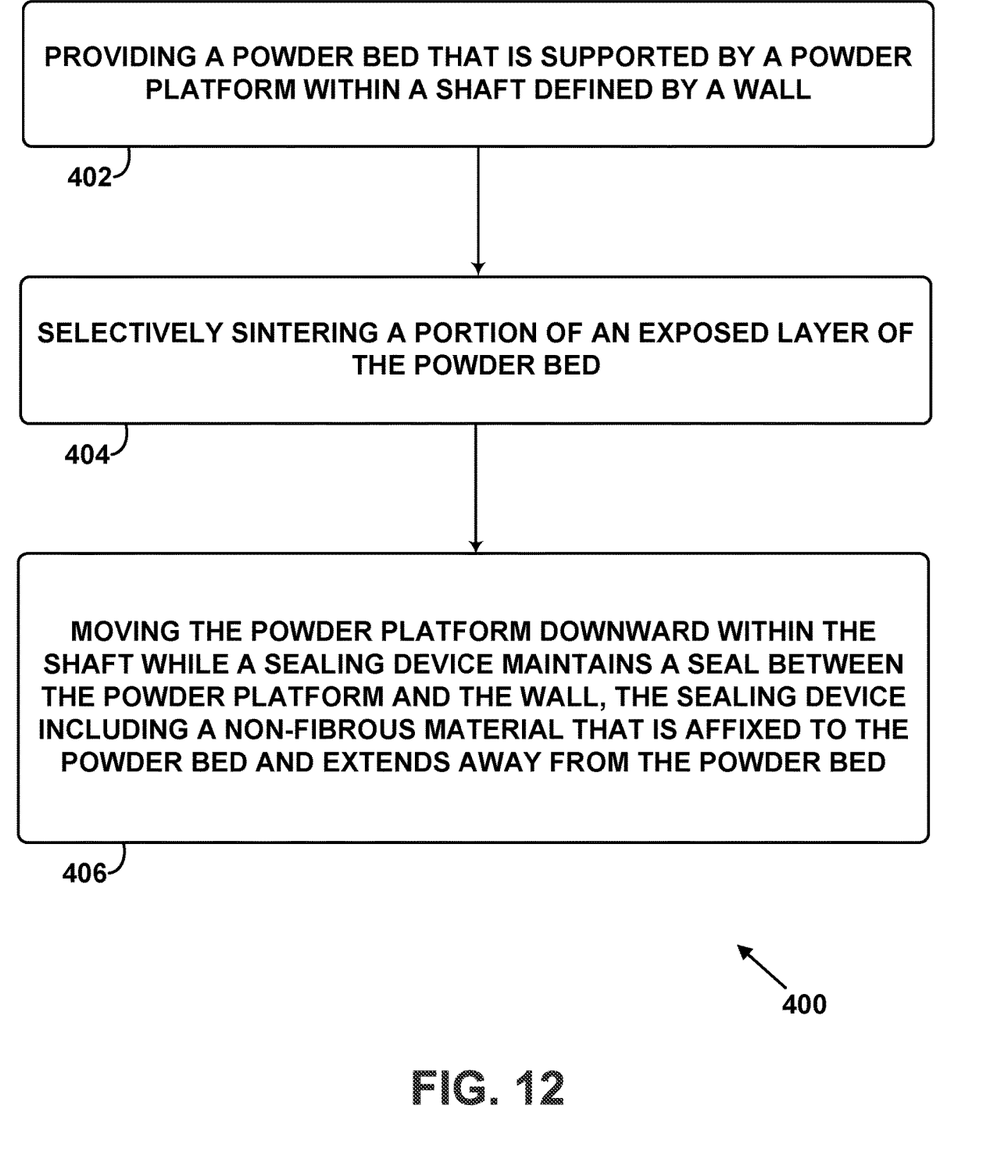
FIG. 12 is a block diagram of a method, according to an example.

FIG. 11 and FIG. 12 are block diagrams of the method 300 and the method 400 for performing powder bed fusion. The method 300 and the method 400 present examples of methods that could be used with the apparatus 100 or the apparatus 200 as shown in FIGS. 1-10. As shown in FIG. 11 and FIG. 12, the method 300 and the method 400 include one or more operations, functions, or actions as illustrated by blocks 302, 304, 306, 402, 404, and 406. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 302, the method 300 includes providing the powder bed 108 that is supported by the powder platform 106 within the shaft 104 defined by the wall 102. This functionality is described above with reference to FIGS. 1-5, for example.

At block 304, the method 300 includes selectively sintering the portion of the exposed layer 352 of the powder bed 108. For example, an electron beam or a laser can be used to selectively sinter the portion of the exposed layer 352 that is shown in FIGS. 2-5.

At block 306, the method 300 includes moving the powder platform 106 downward within the shaft 104 while the sealing device 110 maintains the seal 116 between the powder platform 106 and the wall 102. The sealing device 110 is in a compressed state from the outer perimeter 112 of the sealing device 110 that contacts the wall 102 to the inner perimeter 114 of the sealing device 110 that contacts the powder platform 106. For example, the piston 107 can be used to lower the powder platform 106 that is shown in FIGS. 1-5.

At block 402, the method 400 includes providing the powder bed 108 that is supported by the powder platform 206 within the shaft 104 defined by the wall 102. This functionality is described above with reference to FIGS. 6-10, for example.

At block 404, the method 400 includes selectively sintering the portion of the exposed layer 352 of the powder bed 108. For example, an electron beam or a laser can be used to selectively sinter the portion of the exposed layer 352 that is shown in FIGS. 7-10.

At block 406, the method 400 includes moving the powder platform 206 downward within the shaft 104 while the sealing device 210 maintains the seal 216 between the powder platform 206 and the wall 102. The sealing device 210 includes a non-fibrous material that is affixed to the powder platform 206 and extends away from the powder platform 206. For example, the piston 107 can be used to lower the powder platform 206 that is shown in FIGS. 6-10.

Examples of the present disclosure can thus relate to one of the enumerated clauses (ECs) listed below.

EC 1 is an apparatus for powder bed fusion, the apparatus comprising: a wall that defines a shaft; a powder platform configured to support a powder bed within the shaft and configured to move through the shaft; and a sealing device that is in a compressed state from an outer perimeter of the sealing device to an inner perimeter of the sealing device such that the outer perimeter contacts the wall and the inner perimeter contacts the powder platform to form a seal between the powder platform and the wall.

EC 2 is the apparatus of EC 1, wherein the sealing device comprises a non-fibrous surface that contacts the wall at the outer perimeter.

EC 3 is the apparatus of EC 2, wherein the non-fibrous surface comprises a solid lubricant.

EC 4 is the apparatus of any of ECs 1-3, wherein the wall has as a substantially circular shape.

EC 5 is the apparatus of any of ECs 1-3, wherein the wall is a first wall, the apparatus further comprising a second wall, a third wall, and a fourth wall, the shaft having a rectangular shape defined by the first wall, the second wall, the third wall, and the fourth wall.

EC 6 is the apparatus of any of ECs 1-5, wherein the sealing device exerts a force against the wall via the outer perimeter and against the powder platform via the inner perimeter.

EC 7 is the apparatus of any of ECs 1-6, wherein the outer perimeter substantially conforms to the wall.

EC 8 is the apparatus of any of ECs 1-7, wherein the powder platform comprises: a body; a first member that extends toward the wall and away from the body; and a second member that extends toward the wall and away from the body further than the first member, and wherein the sealing device comprises: a first arm that contacts the first member; a second arm that contacts the wall; and a base that joins the first arm and the second arm and contacts the second member.

EC 9 is the apparatus of EC 8, wherein a portion of the powder bed that is between the first arm and the second arm forces the first arm and the second arm away from each other.

EC 10 is an apparatus for powder bed fusion, the apparatus comprising: a wall that defines a shaft; a powder platform configured to support a powder bed within the shaft and configured to move through the shaft; and a sealing device comprising a non-fibrous material that is affixed to the powder platform and extends away from the powder platform, the sealing device contacting the wall to form a seal between the powder platform and the wall.

EC 11 is the apparatus of EC 10, wherein the sealing device comprises: a first arm that contacts the powder platform; a second arm that contacts the wall; and a pointed end that joins the first arm and the second arm and is configured to scrape powder accumulated on the wall away from the wall.

EC 12 is the apparatus of EC 11, wherein a portion of the powder bed that is between the first arm and the second arm forces the first arm and the second arm away from each other.

EC 13 is the apparatus of any of ECs 10-12, wherein the non-fibrous material comprises a foam material.

EC 14 is the apparatus of any of ECs 10-13, wherein the non-fibrous material comprises graphite.

EC 15 is the apparatus of any of ECs 10-14, wherein the sealing device has an outer perimeter that substantially conforms to the wall.

EC 16 is the apparatus of any of ECs 10-15, wherein the non-fibrous material comprises a solid lubricant.

EC 17 is the apparatus of any of ECs 10-16, wherein the wall has as a substantially circular shape EC 18 is the apparatus of any ECs 10-16, wherein the wall is a first wall, the apparatus further comprising a second wall, a third wall, and a fourth wall, the shaft having a rectangular shape defined by the first wall, the second wall, the third wall, and the fourth wall EC 19 is the apparatus of any of ECs 10-18, wherein the sealing device is configured to scrape powder accumulated on the wall away from the wall.

EC 20 is a method of performing powder bed fusion, the method comprising: providing a powder bed that is supported by a powder platform within a shaft defined by a wall; selectively sintering a portion of an exposed layer of the powder bed; and moving the powder platform downward within the shaft while a sealing device maintains a seal between the powder platform and the wall, the sealing device being in a compressed state from an outer perimeter of the sealing device that contacts the wall to an inner perimeter of the sealing device that contacts the powder platform The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. An apparatus for powder bed fusion, the apparatus comprising:

a wall that defines a shaft;
a powder platform configured to support a powder bed within the shaft and configured to move through the shaft, the powder platform comprising:
  a body;
  a first member that extends toward the wall and away from the body; and
  a second member that extends toward the wall and away from the body, wherein the body, the first member, and the second member form a cavity; and
a sealing device that is in a compressed state from an outer perimeter of the sealing device to an inner perimeter of the sealing device such that the outer perimeter contacts the wall and the inner perimeter contacts the powder platform to form a seal between the powder platform and the wall, wherein the sealing device is positioned within the cavity,
wherein the sealing device comprises:
  a first arm that contacts the first member and is positioned within the cavity;
  a second arm that contacts the wall; and
  a base that joins the first arm and the second arm and contacts the second member,
  wherein a portion of the powder bed that is between the first arm and the second arm applies a first force directed toward the powder platform against the first arm and a second force directed toward the wall against the second arm.

2. The apparatus of claim 1, wherein the sealing device comprises a non-fibrous surface that contacts the wall at the outer perimeter.

3. The apparatus of claim 2, wherein the non-fibrous surface comprises a solid lubricant.

4. The apparatus of claim 1, wherein the wall has as a substantially circular shape.

5. The apparatus of claim 1, wherein the wall is a first wall, the apparatus further comprising a second wall, a third wall, and a fourth wall, the shaft having a rectangular shape defined by the first wall, the second wall, the third wall, and the fourth wall.

6. The apparatus of claim 1, wherein the sealing device exerts a force against the wall via the outer perimeter and against the powder platform via the inner perimeter.

7. The apparatus of claim 1, wherein the outer perimeter substantially conforms to the wall.

8. An apparatus for powder bed fusion, the apparatus comprising:
a wall that defines a shaft;
a powder platform configured to support a powder bed within the shaft and configured to move through the shaft; and
a sealing device that is affixed to the powder platform and extends away from the powder platform, the sealing device contacting the wall to form a seal between the powder platform and the wall,
wherein the sealing device comprises:
  a first arm contacting the powder platform; and
  a second arm contacting the wall, wherein a portion of the powder bed that is between the first arm and the second arm applies a first force directed toward the powder platform against the first arm and a second force directed toward the wall against the second arm.

9. The apparatus of claim 8, wherein the sealing device further comprises a pointed end that joins the first arm and the second arm.

10. The apparatus of claim 9, wherein the portion of the powder bed that is between the first arm and the second arm forces the first arm and the second arm away from each other.

11. The apparatus of claim 8, wherein the sealing device comprises a foam material.

12. The apparatus of claim 8, wherein the sealing device comprises graphite.

13. The apparatus of claim 8, wherein the sealing device has an outer perimeter that substantially conforms to the wall.

14. The apparatus of claim 8, wherein the sealing device comprises a solid lubricant.

15. The apparatus of claim 8, wherein the wall has as a substantially circular shape.

16. The apparatus of claim 8, wherein the sealing device is configured to scrape powder accumulated on the wall away from the wall.

17. The apparatus of claim 1, wherein the sealing device is configured to scrape powder accumulated on the wall away from the wall.

18. The apparatus of claim 8, wherein the sealing device further comprises a base that joins the first arm and the second arm.

19. The apparatus of claim 18, wherein the portion of the powder bed that applies the first force and the second force additionally applies a force to the base that is parallel to the wall.

20. The apparatus of claim 9, wherein the pointed end is configured to scrape powder accumulated on the wall away from the wall.

* * * * *